INVENTOR.
JOHN G. WRIGHT
BY
Parrott & Richards
ATTORNEYS

May 28, 1957  J. G. WRIGHT  2,793,364
WORK SUPPORT ADJUSTING MEANS FOR FASTENER
FORMING AND INSERTING MACHINES
Filed Dec. 9, 1955  3 Sheets-Sheet 3
*Fig. 3*
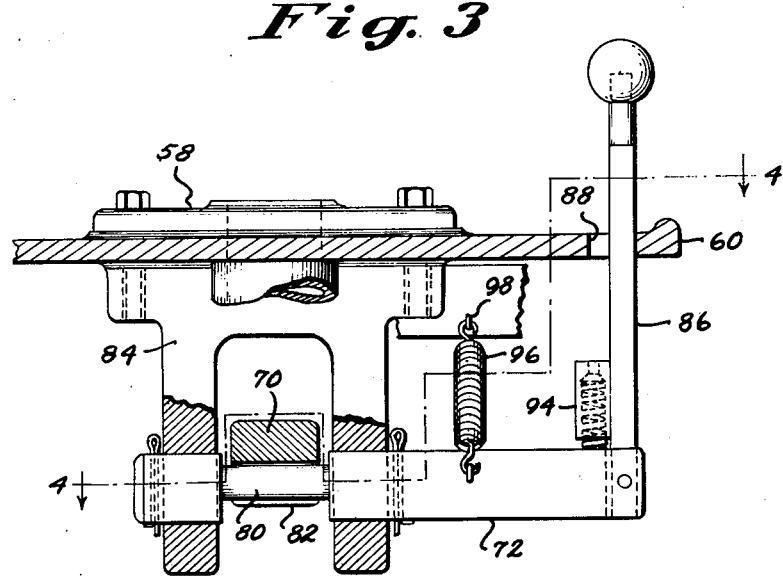
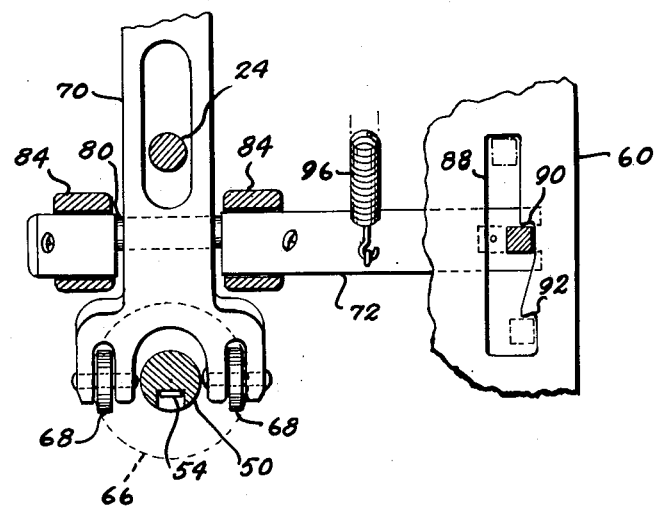
*Fig. 4*
INVENTOR.
JOHN G. WRIGHT
BY
Parott & Richards
ATTORNEYS

United States Patent Office 2,793,364
Patented May 28, 1957

2,793,364

WORK SUPPORT ADJUSTING MEANS FOR FASTENER FORMING AND INSERTING MACHINES

John G. Wright, Atlanta, Ga., assignor to The Auto-Soler Company, a corporation of Georgia Application December 9, 1955, Serial No. 552,149

5 Claims. (Cl. 1—41)

This invention relates to fastener forming and inserting machines, of the type disclosed in U. S. Patent No. 2,698,681, that operate to form fasteners from a continuous length of wire and to insert these fasteners in material or work to be secured. Machines of this sort are commonly employed, for example, in shoe repairing operations such as the attachment of heels and the like.

More specifically, the present invention relates to an improved work supporting mechanism for positioning work in such machines. A work supporting mechanism for this type of machine should, of course, be arranged to allow positioning of the work readily in place for securing, and it must also provide for holding the work effectively against shifting during fastener inserting operations. Such provision for holding the work against shifting is conventionally made by arranging the supporting mechanism so that the work support element is moved in the work supporting direction during each fastener inserting operation and the work is thereby gripped and held between the work support and the operating head of the machine as the fasteners are inserted.

In different types of shoe repair work, however, the best fastener inserting results are obtained with different gripping pressures. For example, a relatively heavy pressure on the work is desirable when attaching heels on men's shoes, while a relatively light pressure must be used in working with some ladies' shoes in order to avoid damaging them.

According to the present invention, an adjusting means is provided by which a proper work supporting pressure may be selected readily to suit the particular work being handled, without requiring any modification otherwise in the normal structure of the fastener forming and inserting machine, and without changing or interfering in any way with the normal procedure used in carrying out the shoe repair operation involved.

The present invention is described in further detail below in connection with the accompanying drawings, in which:

Fig. 3 is a fragmentary sectional detail taken substantially on the line 3—3 in Fig. 2; and Fig. 4 is a further fragmentary sectional detail taken substantially on the line 4—4 in Fig. 3.

Figure 1:
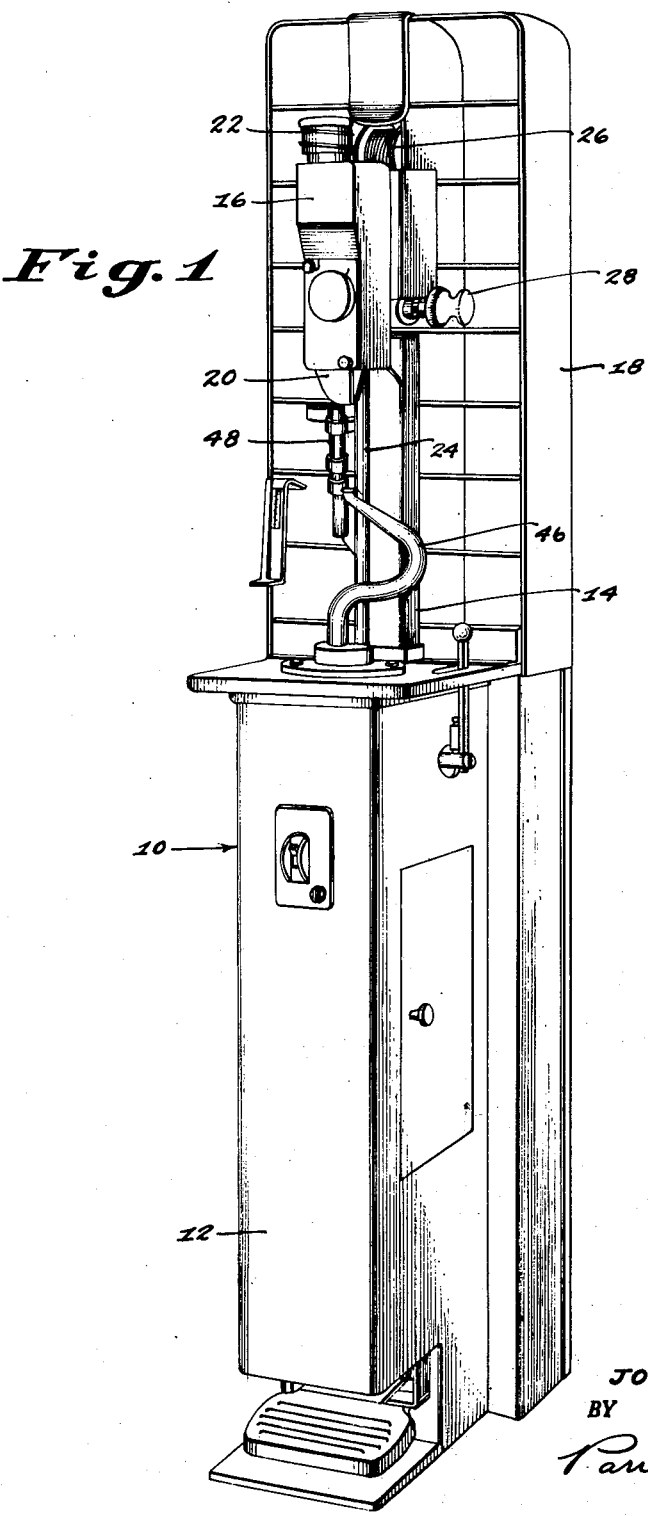
Fig. 1 is a perspective view of a fastener forming and inserting machine of a type in which the work support adjusting means of the present invention may be employed to advantage.

Referring at first to Fig. 1 of the drawings, the fastener forming and inserting machine shown comprises a suitable frame structure, as indicated generally by the reference numeral 10, arranged with a lower housing portion 12 adapted to stand on a floor or similar surface and to house the machine drive (as described further below), an upper standard portion 14 on which an operating head 16 is carried, and an upper rear accessory shelf portion 18.

The illustrated operating head 16 is arranged in substantial correspondence with the disclosure of the above noted U. S. Patent No. 2,698,681 to incorporate a fastener forming knife assembly at 20, associated with a plunger mechanism extending from the top of the operating head 16 at 22, for cyclic actuation from an operating rod 24 that reaches upwardly to the operating head 16 from the machine drive in the lower housing portion 12, a wire supply reel 26 being supported adjacent the operating head 16 so that wire may be drawn therefrom by a feed mechanism, controlled at 28, into the knife assembly 20 for forming successive fasteners therefrom to be driven successively by the plunger mechanism 22 during successive cyclic actuations of the operating head 16, all as described in detail in the above noted prior patent.

Figure 2:
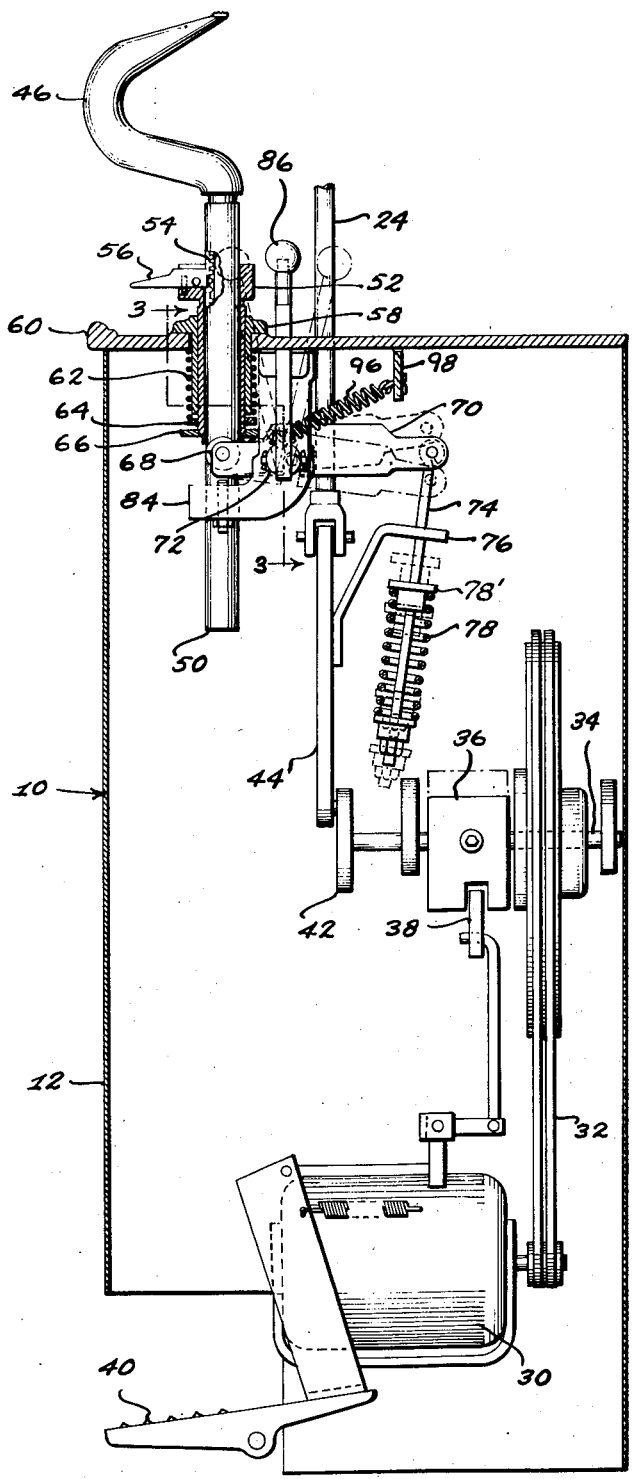
Fig. 2 is a vertical section detail of the lower portion of the machine illustrated in Fig. 1, showing the arrangement of the work support adjusting means.

The drive mechanism for actuating the operating head 16 is illustrated in Fig. 2 of the drawings as comprising a drive motor 30 connected at 32 to a drive shaft 34 in which a clutch mechanism is interposed at 36, the clutch mechanism 36 incorporating a release element 38 arranged to be tripped from a foot pedal 40 for connecting the drive shaft 34 when desired through a crank plate 42 and crank bar 44 to the previously mentioned operating rod 24 that reaches upwardly to the operating head 16. Each revolution of the crank plate 42 results in pulling the operating rod 24 downwardly to actuate the fastener inserting stroke of the plunger mechanism 22, and the operating head 16 is arranged so that the wire feed mechanism, controlled at 28, and the knife assembly 20 are operated to form and position a fastener for driving by the plunger mechanism 22 on each stroke, reference being made again to the disclosure of the above noted prior patent for further details of this arrangement of the operating head 16.

In order to position and hold work in relation to the operating head 16 during the fastener inserting operations, a work support element 46 is arranged for adjustment below the lower tip of the knife assembly 20. A work positioning guide 48 (see Fig. 1), such as is disclosed in U. S. Patent No. 2,602,926, may also be arranged adjacent the tip of knife assembly 20, if desired.

The work support element 46 is formed with an extended shank 50, as shown in Fig. 2, which is arranged for slidable adjustment in a bushing 52, the shank 50 being fitted longitudinally with a rack 54, and the bushing 52 carrying a pawl 56 for releasably holding the shank 50 at any adjusted position therein. The shank bushing 52 is in turn slidably carried within a mounting sleeve 58 that is fixed in place on a shelf plate forming the top of the lower frame structure housing portion 12. Below the shelf plate 60, a compression spring 62 is disposed about the mounting sleeve 58 to bottom on a collar flange 64 fixed adjacent the lower end of the shank bushing 52 so as to impose a downward bias on this bushing 52 within the mounting sleeve 58.

The downward bias on bushing 52 is opposed by means of a lifting washer 66 seated at its lower end and caused to bear upwardly thereon by supporting rollers 68 journalled at the adjacent end of a lifter arm 70 that is fulcrumed on an eccentric shaft 72 intermediate its length and pivotally connected at its other end with a lifter rod 74 extending downwardly through a bracket arm 76 fixed on the crank bar 44 and carrying a compression spring 78 at its lower end in spaced relation below the bracket arm 76 for abutment therewith through a spacer bushing 78' fitted at the upper end of spring 78 to position it on lifter rod 74 so as to transmit a lifting pressure to the work support 46 through the lifter arm 70 during each revolution of the crank plate 42 to actuate the operating head 16.

The eccentric shaft 72, on which the lifter arm 70 is fulcrumed, has an eccentric portion 80 arranged for supporting lifter arm 70 at a downwardly opening slot 82 therein (see Fig. 3), the eccentric shaft 72 being carried for rotation at each side of this eccentric portion 80 in the arms of a supporting yoke 84 that is attached at the bottom face of the shelf plate 60 and arranged to straddle the lifter arm 70. The eccentric shaft 72 is also arranged to extend laterally at one side of this supporting yoke 84 to carry a pivoted adjusting lever 86 at its extending end, and this adjusting lever 86 is proportioned to extend in turn upwardly from the eccentric shaft 72 through a slot 88 in the shelf plate 60 for access readily adjacent the work support element 46, the slot 88 being angled slightly with respect to the axis of eccentric shaft 72 and having selective retaining notches formed therein as at 90 and 92, and the adjusting lever 86 being fitted with a spring bias means 94 adjacent its pivoted mounting on the eccentric shaft 72 and a tension spring 96 being extended from the eccentric shaft 72 to an anchor point at 98 with respect to the frame structure housing portion 12, so as to bias the adjustment lever 86 toward a seated position at one of the retaining notches 90 or 92 in the shelf plate slot 88 or at the remote end of slot 88.

The result of this arrangement is to provide for manipulation of the adjusting lever 86 so as to fix the eccentric shaft 72 selectively at one of a plurality of rotated positions and thereby adjust the fulcrumed disposition of the lifter arm 70 about a substantially fixed normal position of the pressure applying end thereof that carries the supporting rollers 68 adjacent the work support shank 50. This pressure applying end at the supporting rollers 68 remains substantially fixed normally because the lifter arm 70 is fulcrumed on eccentric shaft 72 closest to this end and the weight of the connected operating elements maintains the supporting rollers 68 bearing at the lifting washer 66 on shank bushing 52.

Accordingly, the fulcrum adjustment of lifter arm 70 is directed toward changing the position of its other end at which the lifter rod 74 is connected, and this change in position is amplified in relation to the fulcrum adjustment because of the closer spacing of eccentric shaft 72 to the pressure applying end of lifter arm 70. The change in position of lifter arm 70 at the end carrying lifter rod 74 has the effect of adjusting in a corresponding extent the spacing at which the compression spring 78 is disposed below the bracket arm 76 carried by crank bar 44, and consequently the degree in which this spring 78 can be compressed for transmitting pressure through the lifter arm 70.

That is, the bracket arm 76 travels downwardly to the same extent upon each revolution of the crank plate 42 that occurs to actuate the operating head 16 through the rod 24, and pressure is transmitted to the lifter arm 70 only after the crank plate 42 has revolved far enough to lower the crank bar bracket arm 76 into abutment with the spacer bushing 78′ at the upper end of compression spring 78. Upon this abutment, lifter rod 74 is caused to follow yieldably the motion of crank bar 44 so as to pull downwardly at the connected end of lifter arm 70 and cause its pressure applying end to rise so that the supporting rollers 68 shift the shank bushing 52 and, through pawl 56, the work support element 46 upwardly in the work supporting direction.

This upward shift of the work support element 46 will continue until it has resulted in gripping or pressing the work supported against the lower tip of the knife assembly 20 sufficiently to resist further shifting. When this resistance is encountered it will react at the spring 78 to compress it, and compression of spring 78 will in turn exert a greater work supporting pressure.

However, the degree to which spring 78 can be compressed is limited by the extent of the stroke portion during which crank bar bracket arm 76 is allowed to act on it, and this extent is determined by the adjusted spacing of spring 78 below the bracket arm 76. A close spacing will result in a higher possible degree of compression and a consequent heavier work supporting pressure being applied, while any increase in this spacing will decrease the work supporting pressure accordingly. This is the basis on which the work supporting pressure is controlled from adjusting lever 86 to providing for setting this pressure readily to suit the nature of the particular work being handled.

The present invention has been described in detail above for purposes of illustration only and is not intended to be limited by this description or otherwise except as defined in the appended claims.

I claim:

1. In a fastener forming and inserting machine adapted for forming a plurality of fasteners from a continuous length of wire, the combination with an operating mechanism incorporating means for cyclic actuation of fastener forming and inserting operations, of a work supporting mechanism comprising a work support mounted on said machine for adjustment to position work in relation to said operating mechanism and for additionally shifting in the work supporting direction from its adjusted position to grip and hold said work in place during fastener inserting operations, and arm member fulcrumed on said machine with one end disposed for applying pressure to shift said work support in said direction and the other end yieldably connected for displacement by said operating mechanism to cause application of said pressure during each fastener inserting operation, and means for adjusting the fulcrumed disposition of said arm member about a substantially fixed position of the first mentioned end thereof and thereby adjusting the extent of displacement of its other end by said operating mechanism and the consequent degree of gripping pressure applied through said arm member to work positioned by said work support.

2. In a fastener forming and inserting machine adapted for forming a plurality of fasteners from a continuous length of wire and inserting said fasteners in work to be secured, a work support mounted on said machine for shifting in work supporting direction to grip and hold said work in place during fastener inserting operations, an operating rod arranged on said machine for displacement to actuate said fastener forming and fastener inserting operations cyclically, an arm member fulcrumed on said machine with one end disposed for applying pressure to shift said work support in said work supporting direction and the other end yieldably connected for displacement with said operating rod to cause application of said pressure during each fastener inserting operation, and means for adjusting the fulcrumed disposition of said arm member about a substantially fixed position of the first mentioned end thereof and thereby adjusting the connection of its other end to vary the extent of displacement of said other end and the consequent degree of gripping pressure applied through said arm member.

3. A work supporting mechanism for fastener inserting machines and the like, said mechanism comprising a work support mounted for shiting in work supporting direction from a normal biased position to grip and hold work in place during fastener inserting motion of said machine, an arm member fulcrumed on said machine with one end disposed for applying pressure to shift said work support in said work supporting direction, means for adjusting the fulcrumed disposition of said arm member about a substantially fixed position of said pressure applying end in relation to the normal biased position of said work support, and means connecting the other end of said arm member for yieldably following from the resulting adjusted position thereof a correspondingly adjusted portion of the fastener inserting motion of said machine to cause the application of an accordingly adjusted degree of pressure for shifting said work support during each fastener inserting motion.

4. A work supporting mechanism as defined in claim 3 and further characterized in that said arm member is fulcrumed on an axis spaced closest to said pressure applying end so that adjustment of the fulcrumed disposition of said arm member causes an amplified resulting adjustment in position of said other end.

5. A work supporting mechanism as defined in claim 3 and further characterized in that said arm member is fulcrumed on an eccentric shaft mounted for rotation, and said adjusting means comprises a lever extending laterally from said shaft, and means for releasably fixing said lever at one of a plurality of positions spaced about the axis of said shaft and thereby fixing said shaft at a desired rotated position.

No references cited.